United States Patent

Shu-Hsien

[19]

[11] Patent Number: 6,152,250
[45] Date of Patent: Nov. 28, 2000

[54] POWER DRIVING CONTROL SYSTEM OF ELECTRICALLY-ASSISTED BICYCLE

[76] Inventor: Li Shu-Hsien, 5F, 21, Lane 16, Sec.1, Chung-Shan N. Rd., Taipei, Taiwan

[21] Appl. No.: 09/110,478

[22] Filed: Jul. 7, 1998

[51] Int. Cl.[7] .......................................... B62M 7/00
[52] U.S. Cl. ................................... 180/220; 318/2
[58] Field of Search ..................... 180/220–224, 180/230, 231, 65.2, 65.6, 65.8; 318/1, 2, 11, 12, 139

[56] References Cited

U.S. PATENT DOCUMENTS

| | | | |
|---|---|---|---|
| 5,375,676 | 12/1994 | Takata | 180/206 |
| 5,749,429 | 5/1998 | Yamauchi | 180/205 |
| 5,992,553 | 11/1999 | Morrison | 180/206 |

*Primary Examiner*—Chris Schwartz
*Assistant Examiner*—C T Bartz

*Attorney, Agent, or Firm*—Bacon & Thomas, PLLC

[57] ABSTRACT

A power driving control system is adapted to be incorporated in an electrically-assisted bicycle which includes an electrical motor mechanically coupled to wheels of the bicycle. The power driving control system includes a first speed detection device for detecting the rotational speed of the pedals actuated by the rider's feet and a second speed detection device to detect the rotational speed of the rear wheel of the bicycle which incorporates a rear derailleur system, and a processor-based controller for receiving the signals from the two speed detection devices and controlling the electrical power supplied from a battery set to the motor in response to the ratio of the two rotational speeds, which may be varied in accordance with the riding condition of the bicycle so that the motor is controlled in a power-efficient way. A manual control is also provided which allows the bicycle rider to directly control the power supplied from the battery set to the motor so that the motor may be selectively controlled in an automatic fashion based on the two rotational speeds, or manually directly by the rider.

14 Claims, 4 Drawing Sheets

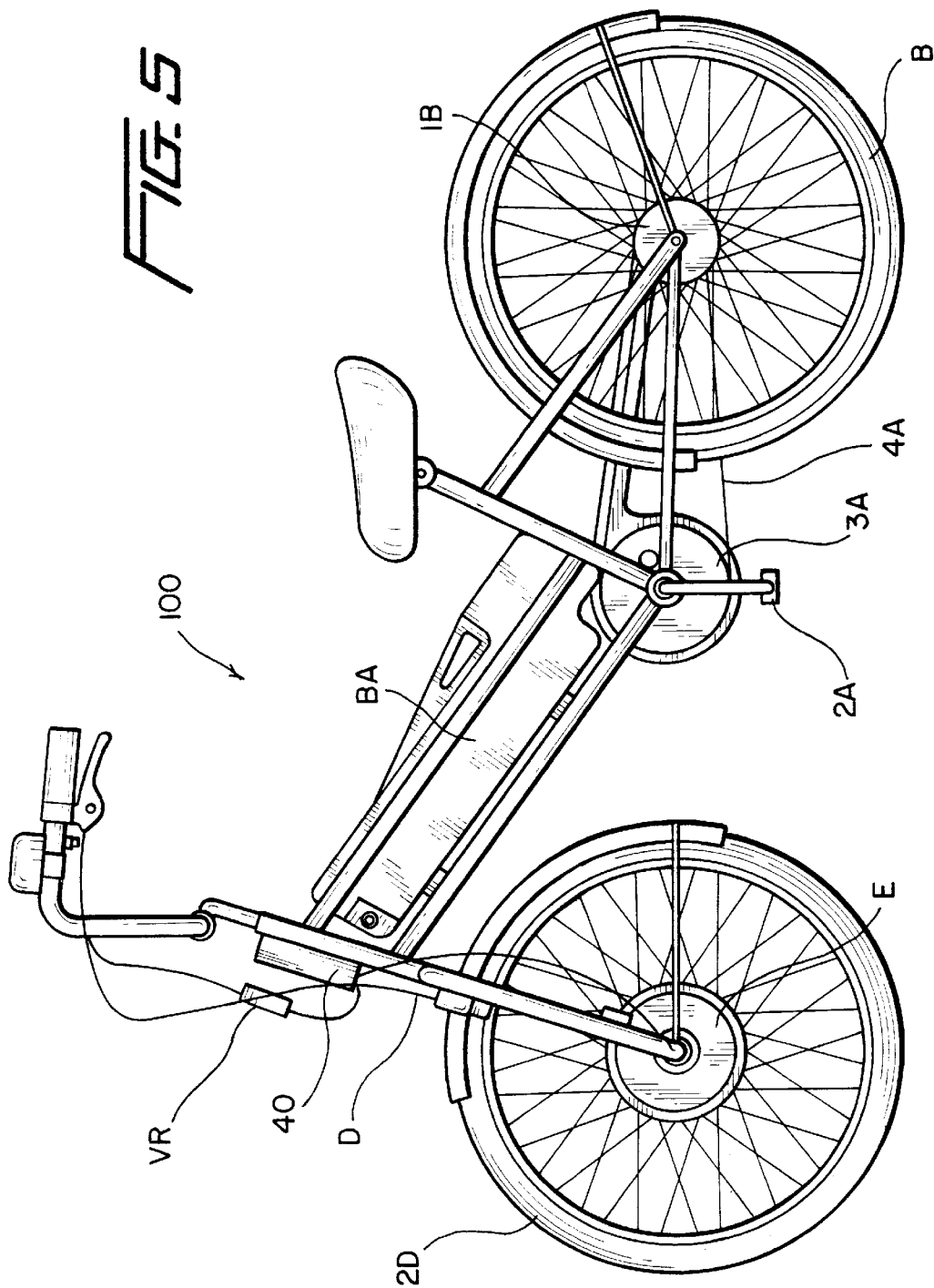

POWER DRIVING CONTROL SYSTEM OF ELECTRICALLY-ASSISTED BICYCLE

BACKGROUND OF THE INVENTION

1. Field of the Invention

The present invention relates generally to a power bicycle or an electrically-assisted bicycle and in particular to a power driving control system to be incorporated in the power bicycle.

2. Related Arts

Power bicycles or electrically-assisted bicycles have been known for many years and have become an environmental protection transportation means. The power bicycle can be driven both manually and by electric motor. Since the motor is usually powered by a battery set which can only store limited power, the power consumption of the battery set has to be very conservative and efficient in order to extend the operation life of the battery set.

Conventionally, the power supply is controlled by a simple switch mounted on the handle bar of the bicycle, and the electrical power thus supplied from the battery set to the motor is not regulated and properly controlled so that the power is not utilized in an efficient way.

Furthermore, the conventional device is in general incapable of adjusting the electrical power supplied to the motor so that it is not possible to adjust the output mechanical power of the motor. This may cause a waste of the rider's human labor and the electrical power of the system. Also, it is often that the motor is started and/or stopped in a sudden way and this cases vibration to the bicycle and thus is comfortable to the rider.

In addition, the output mechanical power of the motor is in general constant through the whole travel of the bicycle. Generally speaking, this is not very efficient because the bicycle may occasionally move uphill and downhill, which requires different mechanical power to be applied to the bicycle.

It is thus desirable to provide a power driving control system for a power bicycle which applies different mechanical power to the bicycle so as to fully exploit the electrical power in a more efficient fashion.

SUMMARY OF THE INVENTION

Thus, a principal object of the present invention is to provide a power driving control system for an electrically-assisted bicycle which regulates the electrical power supplied to the electrical motor that assists in driving the bicycle in response to the driving condition, so as to more efficiently exploit the electricity stored in the battery set that powers the motor.

Another object of the present invention is to provide a power driving control system which allows the electrical power supplied to the motor to be controlled both manually and automatically in response to the riding condition of the bicycle.

To achieve the above objects, in accordance with the present invention, there is provided a power driving control system adapted to be incorporated in an electrically-assisted bicycle which includes an electrical motor mechanically coupled to wheels of the bicycle, the power driving control system comprising a first speed detection device for detecting the rotational speed of the pedals actuated by the rider's feet and a second speed detection device to detect the rotational speed of the rear wheel of the bicycle which incorporates a rear derailleur system, a processor-based controller for receiving the signals from the two speed detection devices and controlling the electrical power supplied from a battery set to the motor in response to the ratio of the two rotational speeds, which may be varied in accordance with the riding condition of the bicycle so that the motor is controlled in a power-efficient way. A manual control is also provided which allows the bicycle rider to directly control the power supplied from the battery set to the motor so that the motor may be selectively controlled in an automatic fashion based on the two rotational speeds, or manually directly by the rider.

BRIEF DESCRIPTION OF THE DRAWINGS

The present invention will be better understood from the following description of a preferred embodiment thereof, with reference to the attached drawings, wherein:

FIG. 5 is a side view showing the power driving control system of the present invention mounted in the bicycle.

DETAILED DESCRIPTION OF THE PREFERRED EMBODIMENT

Figure 1:
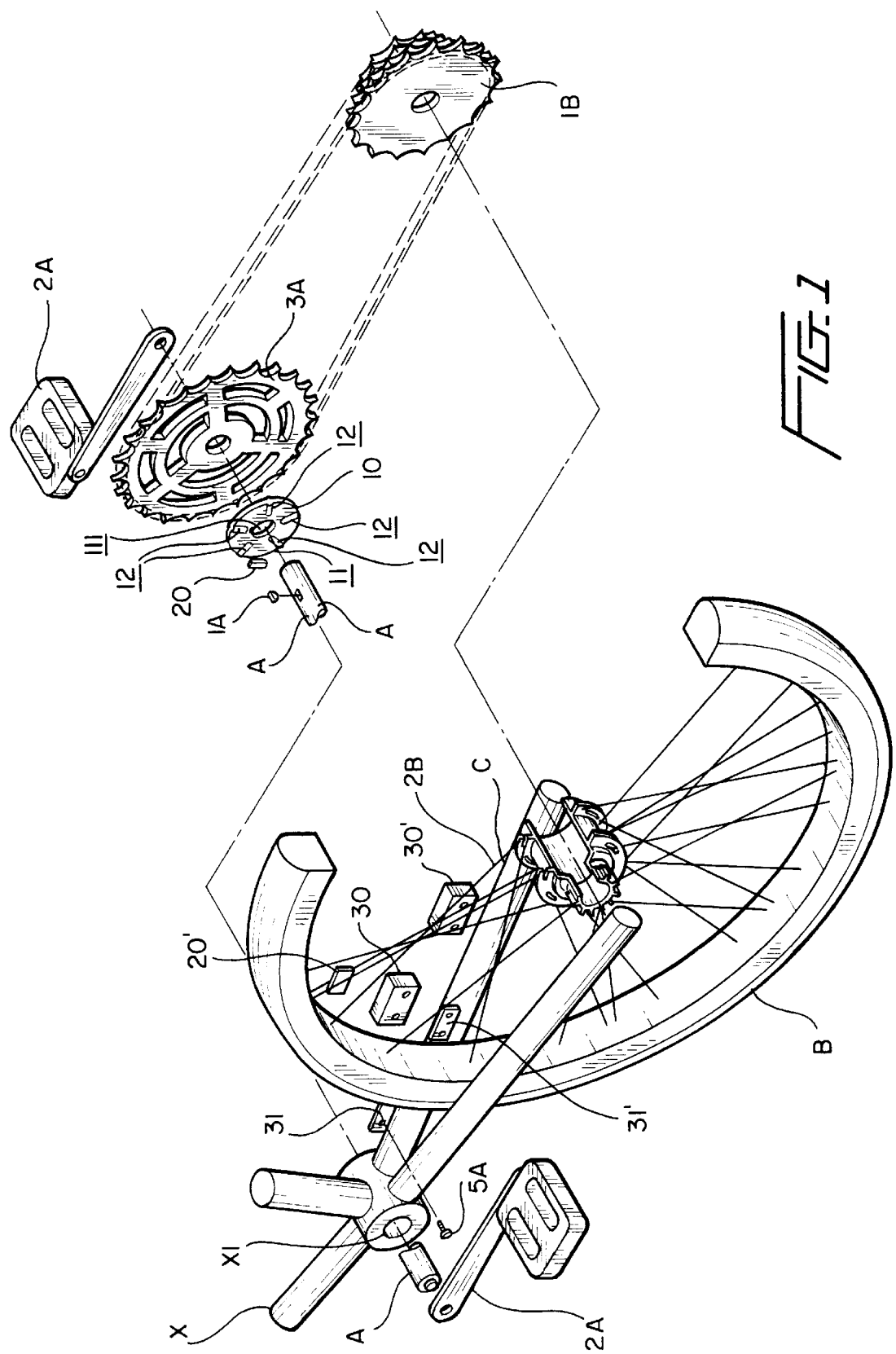
FIG. 1 is an exploded perspective view showing a power driving control system constructed in accordance with the present invention, together with a portion of a bicycle to which the power driving control system is mounted.
Figure 2:
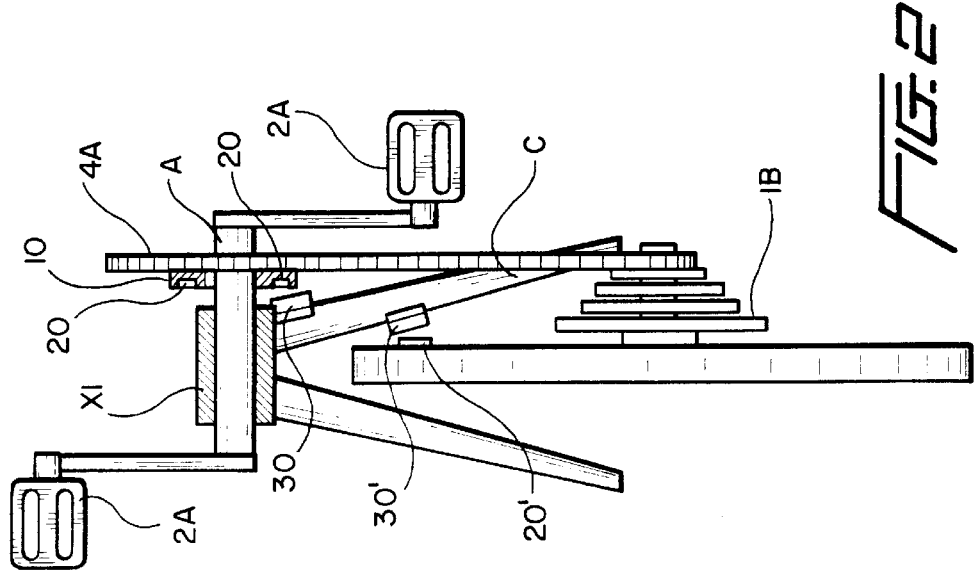
FIG. 2 is a top plan view of the power driving control system of the present invention mounted in the bicycle.

With reference to the drawings and in particular to FIGS. 1 and 2, wherein a power driving control system of an electrically-assisted bicycle constructed in accordance with the present invention is shown, the power driving control system of the present invention comprises a speed detection disk 10 having a central bore 11 with a notch 111, serving as a key way, formed thereon to be fit over a pedal crank axle A of the bicycle and is fixed thereto by means of a key 1A received in the key way 111. The crank axle A is rotatably received within and supported by a five-branch tube X1 of the bicycle so that when the axle A is driven by means of the pedals 2A of the bicycle to rotate, the speed detection disk 10 is rotated in unison with the crank axle A. The speed detection disk 10 comprises a plurality of radially-extending slots 12 equally spaced along a circumference of the speed detection disk 10 to each receive and hold therein a first movable sensing element 20.

A front chain wheel or ring 3A is fixed to and rotatably driven by the crank axle A to drive a chain 4A which engages a driven chain ring or a derailleur chain ring 1B mounted on the rear wheel B of the bicycle so that by actuating the pedals 2A, the rear wheel B is driven to rotate via the chain 4A. A second movable sensing element 20' is mounted on the rear wheel B, preferably on the spokes 2B of the rear wheel B.

Corresponding to the first and second movable sensing elements 20 and 20', are first and a second stationary sensing elements 30 and 30' which are counterparts of the first and second movable sensing elements 20 and 20' which are respectively provided and fixed on suitable positions on the bicycle frame by means of holders 31 and 31' which are fixed to the bicycle frame by means of for example screws 5A. Thus, the stationary sensing elements 30 and 30' are located corresponding to the respective movable sensing elements 20 and 20' to detect the rotational speeds of the speed detection disk 10 (namely the rotational speed of the pedals 2A) and the rotational speed of the rear wheel B.

Although in the embodiment illustrated, there is only one second movable sensing element 20', it is apparent to those skilled in the art to provide more than one such sensing element 20' mounted to the rear wheel B in an angularly equally-spaced manner for detection of the rotational speed of the rear wheel B.

The sensing elements 20, 20' and 30, 30' may be any suitable sensing devices which detect when the movable sensing elements 20 and 20' are driven pass through and align with the stationary sensing elements 30 and 30'. For example, the movable sensing elements 20 and 20' may include magnets or infra-red emitters, but are not limited thereto. The stationary sensing elements 30 and 30' may include photo-electrical switching elements, reed switch or Hall ICs which are capable to count the number of pulses, but are not limited thereto.

Figure 3:
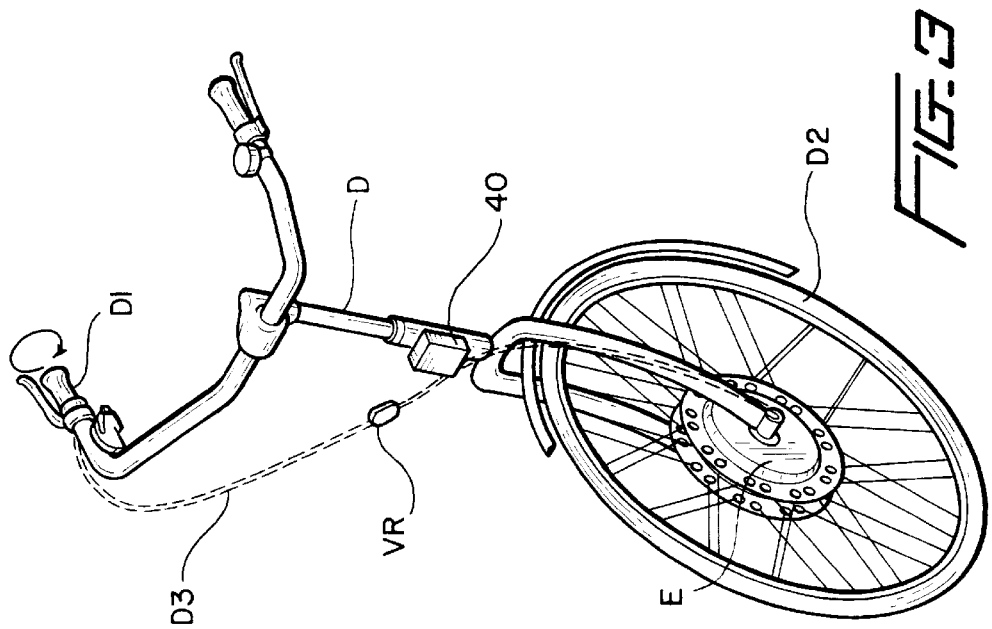
FIG. 3 is a perspective view showing the manual control and the processor-based controller of the present inventive power driving control system that is connected to and controls the operation of an electrical motor mounted to a front wheel of the bicycle.

With reference to FIG. 3, a processor-based controller 40 may be mounted to any suitable location on the bicycle frame, such as the head tube D as shown in FIG. 3. The controller 40 receives a first speed signal indicating the rotational speed of the pedals 2A from the first stationary sensing element 30 and a second speed signal indicating the rotational speed of the rear wheel B from the second stationary sensing element 30'. The controller 40 also receives a manual control signal from a manual control which is controllable by the rider of the bicycle to manually adjust or control an electrical motor E that is mounted to drive the front wheel D2 of the bicycle. Preferably, the manual control is made in the form of a rotatable handgrip D1 which is rotatable by the rider's hand and the rotation of the handgrip manual control D1 is converted to a linear motion by means of a cable D3 to adjust the resistance of a variable resistor VR. The variable resistor VR is electrically connected to the controller 40.

The handgrip type manual control D1 may be replaced by a linear motion type switch to control the linear motion of the cable or the variable resistor VR may be replaced by a Hall IC element which has linear characteristics. These are examples of possible variation of the present invention.

Figure 4:
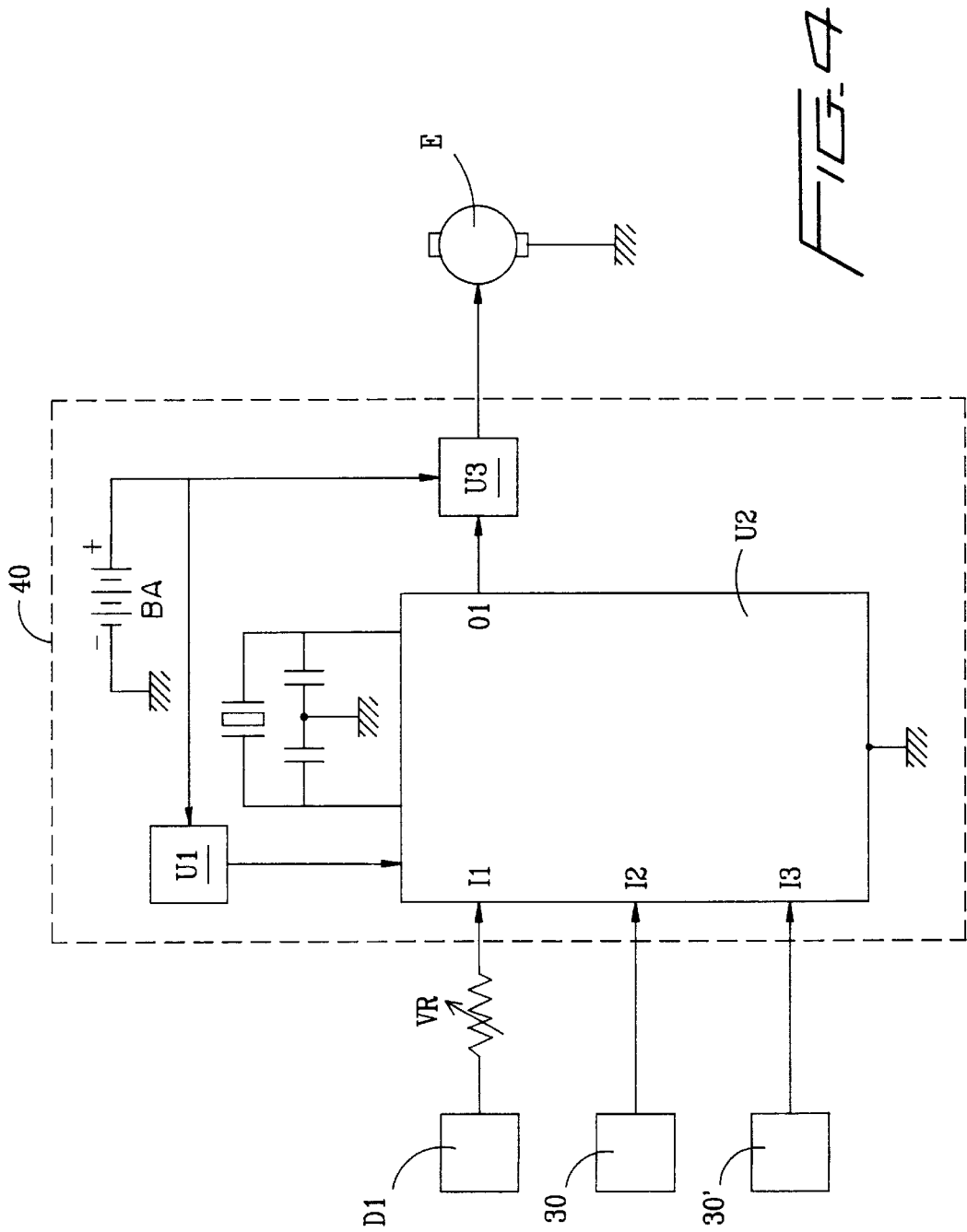
FIG. 4 is an exemplary circuit diagram of the processor-based controller of the power driving control system in accordance with the present invention.

With reference to FIG. 4 which shows a circuit diagram of the processor-based controller 40, the circuit of the controller 40 comprises a voltage regulation circuit U1, which converts the electricity from a power supply, such as a battery set BA, into a desired working voltage and supplies the working voltage to a microprocessor U2. The microprocessor U2 has three inputs I1, I2 and I3 and at least one output O1. The first input I1 receives a signal from the variable resistor VR controlled by the manual control D1 to allow the microprocessor U2 to directly generate a control signal to the motor E.

The second input I2 receives the first speed signal indicating the rotational speed of the pedals A2 from the first stationary sensing element 30 and the third input I3 receives the second speed signal indicating the rotational speed of the rear wheel B from the second stationary sensing element 30', and these two speed signals together cause a control signal to be supplied to the motor E via the output O1 of the microprocessor U2.

The controller 40 also comprises a driving circuit U3 which receives the control signal from the output O1 of the microprocessor U2 and is connected to the power supply (battery set in this case) BA so as to supply desired electrical power from the battery set BA to the motor E, which in turn sets the mechanical output power (the rotational speed and the torque) of the motor E to a desired level to assist driving the bicycle in a power efficient fashion.

It is understood that the circuit described above is only an example of the present invention and the present invention is not limited thereto.

With reference to FIG. 5, which shows a practical application of the power driving control system of the present invention that is mounted in a bicycle 100, the rider of the bicycle actuates the pedals 2A to have the crank axle A and thus the front chain ring 3A rotate. The bicycle 100 is equipped with a rear derailleur system in which a number of different derailleur chain rings 1B are provided to selectively drive the rear wheel B. In operation, the rider, according to his or her need, switches between different derailleur chain rings 1B and the selected derailleur chain ring 1B is coupled to the front chain ring 3A by means of the chain 4A. Different derailleur chain rings 1B provide different ratios between the rotational speed thereof and the rotational speed of the front chain ring 3A. The different speed ratio between the front chain ring 3A and the derailleur chain ring 1B is detected by the sensing elements 20, 20' and 30, 30' and is supplied to the microprocessor U2 to set the electrical power supplied from the power supply BA to the motor E.

For example, in case that the bicycle 100 is just started to move or is ridden uphill which requires a great power output to move the bicycle 100, the rider usually switches the rear derailleur system to such a derailleur chain ring 1B which provides a low speed but high torque output on the rear wheel B. At this time the ratio between the rotational speed of the rear wheel B that is detected by the second movable sensing element 20' and the second stationary sensing element 30' and the rotational speed of the front chain ring 3A that is detected by the first movable sensing elements 20 and the first stationary sensing element 30 is small and the microprocessor U2 instructs the driving circuit U3 to supply great electrical power to the motor E to forcibly assist moving the bicycle 100.

In case that the bicycle 100 is moving in a substantially horizontal surface, the rider may switch the rear derailleur system to such a derailleur chain ring that provides high speed but lower torque output to the bicycle 100 to increase the speed of the bicycle. At this time the speed ratio between the rear wheel B and the front chain ring 3A becomes large which causes the microprocessor U2 to instruct the driving circuit U3 to reduce the electrical power supplied to the motor E.

In case that the bicycle 100 is moving downhill, the rider may stop actuating the front chain ring 3A while the rear wheel B is still rotating due to the gravity of the bicycle 100, the speed ratio would become very large which causes the microprocessor U2 to further reduce and in the extreme case stop the power supply to the motor E.

With such an arrangement, the electrical power supplied to the motor E may be automatically controlled in response to the rotational speed of the rear wheel or more precisely, to the engaged or selected derailleur chain ring, which optimizes the power consumption of the battery set BA and the operation of the motor E.

It is understood that although it has been described to mount the motor E directly to the front wheel 2D, there are other alternatives in mounting the motor E to drive the bicycle. For example, the motor E may be fixed to the five branch tube of the bicycle frame and coupled to the bicycle wheels by means of a chain or a belt. Alternatively, the motor E may be mounted to drivingly engage the rim of the front wheel. Or, if desired, the motor E may be directly or indirectly coupled to the rear wheel.

The manual control D1 provides a function to allow the rider to manually control the electrical power supplied to the motor E. The rotation of the manual control D1 is converted into different electrical signal by means of the variable resistor VR and the signal is applied to the controller 40 to control electrical power supplied to the motor E via the driving circuit U3.

Thus, the present invention provides both automatic control and manual control of the electrical power supplied to the motor E which in turn determines the output mechanical power of the motor E. The manual control is effected by manual rotation of the handgrip type manual control D1 which in turn gives a signal to the microprocessor via the variable resistor VR. The automatic control is done by means of the ratio of the speed of the rear wheel B detected by the sensing elements 20' and 30' and the speed of the pedals 2A detected by the sensing elements 20 and 30.

The present invention may also be extended to bicycles with front derailleur system or bicycles with both front and rear derailleur system. Furthermore, the control provided by the controller 40 may be done by means of software executable in the microprocessor U2 which allows the electrical power supplied to the motor E is a more versatile fashion. This is apparent to those skilled in the art.

The above description is made with respect to the preferred embodiment of the present invention and for those skilled in the art, it is possible to make a variety of modifications and changes to the specific embodiment without departing from the scope and spirit of the present invention. All these modifications and changes should be considered within the scope of the present invention as defined in the appended claims.

What is claimed is:

1. A power driving control system adapted to be incorporated in a bicycle having an electrical motor mechanically coupled to wheels of the bicycle and comprising a derailleur system so as to allow variation of a ratio between (a) a rotational speed of one of the wheels of the bicycle; and (b) a rotational speed of a crank axle which is driven by pedals by being actuated by a rider's feet, the electrical motor being powered by a power supply controlled by said power driving control system, said power driving control system comprising:

first speed detection means for detecting the rotational speed of the crank axle and generating a first speed signal;

second speed detection means for detecting a rotational speed of the wheel of the bicycle and generating a second speed signal; and a controller which receives the first speed signal and the second speed signal and determines a speed ratio of the second speed signal to the first speed signal, from which the controller generates an output signal which is applied to control the power supply to the motor so as to regulate mechanical power output from the motor to the bicycle, wherein when said speed ratio is small, a first amount of power is supplied to said electrical motor to forcibly assist moving the bicycle, when said speed ratio becomes large, a second amount of power relatively smaller than the first amount is supplied to said electrical motor.

2. The power driving control system as claimed in claim 1, further comprising a manual control which is manually operable to generate an input signal to the controller so as to manually control the electrical power from the power source to the motor and thus manually regulate the mechanical power output from the motor to the bicycle.

3. The power driving control system as claimed in claim 1, wherein the first speed detection means comprises a disk coupled to and driven by the crank axle so as to be rotatable in unison therewith, at least one first movable sensing element being fixed to the disk to be rotatable therewith, a first stationary sensing element being mounted to a frame of the bicycle to be corresponding to the first movable sensing element so as to detect each time the first movable sensing element passes the first stationary sensing element and generates the first speed signal.

4. The power driving control system as claimed in claim 3, wherein the disk comprises a plurality of first movable sensing elements equally spaced along a circumference thereof.

5. The power driving control system as claimed in claim 3, wherein the first movable sensing element is selected from the group consisting of magnet, ring magnet having a multiplicity of magnetic poles and infrared emitter.

6. The power driving control system as claimed in claim 3, wherein first stationary sensing element is selected from the group consisting of reed switch, Hall IC, and photo-electrical switch.

7. The power driving control system as claimed in claim 1, wherein the second speed detection means comprises at least one second movable sensing element being fixed to the wheel to be rotatable therewith, a second stationary sensing element being mounted to a frame of the bicycle to be corresponding to the second movable sensing element so as to detect each time the second a movable sensing element passes the second stationary sensing element and generates the second speed signal.

8. The power driving control system as claimed in claim 7, wherein the second movable sensing element is mounted to spokes of the wheel.

9. The power driving control system as claimed in claim 7, wherein the second movable sensing element is selected from the group consisting of magnet, ring magnet having a multiplicity of magnetic poles and infrared emitter.

10. The power driving control system as claimed in claim 7, wherein second stationary sensing element is selected from the group consisting of reed switch, Hall IC, and photo-electrical switch.

11. The power driving control system as claimed in claim 1, wherein the controller comprises a microprocessor which receives the first and second speed signals from the first and second speed detection means, determines the speed ratio and provides the output signal to control the electrical power supplied to the motor.

12. The power driving control system as claimed in claim 11, wherein the controller further comprises a voltage regulation circuit which receives and regulates electrical power from the power supply and supplies the regulated electrical power to the microprocessor to serve as working voltage of the microprocessor.

13. The power driving control system as claimed in claim 11, wherein the controller comprises a power control circuit receives the output signal from the microprocessor and controls the electrical power from the power source to the motor so as to regulate the mechanical power output from the motor.

14. The power driving control system as claimed in claim 1, wherein the power source comprises a battery set.

* * * * *